United States Patent
Li et al.

(10) Patent No.: US 8,037,188 B2
(45) Date of Patent: Oct. 11, 2011

(54) SOFT HANDOFF ACROSS DIFFERENT NETWORKS ASSISTED BY AN END-TO-END APPLICATION PROTOCOL

(75) Inventors: Peng Li, San Diego, CA (US); Arungundram C. Mahendran, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1105 days.

(21) Appl. No.: 10/366,454

(22) Filed: Feb. 12, 2003

(65) Prior Publication Data

US 2004/0199637 A1 Oct. 7, 2004

(51) Int. Cl.
*G06F 15/16* (2006.01)
(52) U.S. Cl. ........ 709/227; 455/440; 455/432; 455/436; 455/445; 370/331; 370/490; 370/465; 370/401
(58) Field of Classification Search .......... 709/227; 370/328, 331, 490, 465, 401; 455/438, 442, 455/440, 432, 436, 445
See application file for complete search history.

(56) References Cited

U.S. PATENT DOCUMENTS

| | | | |
|---|---|---|---|
| 6,049,716 A | 4/2000 | Jung | |
| 6,119,006 A * | 9/2000 | Shaffer et al. | 455/440 |
| 6,173,183 B1 * | 1/2001 | Abu-Amara et al. | 455/442 |
| 6,175,588 B1 | 1/2001 | Visotsky et al. | |
| 6,549,946 B1 * | 4/2003 | Fisher et al. | 709/227 |
| 6,574,475 B1 * | 6/2003 | Suzuki | 455/438 |
| 6,708,030 B1 * | 3/2004 | Horikawa | 455/436 |
| 6,834,050 B1 * | 12/2004 | Madour et al. | 370/392 |
| 6,977,898 B1 * | 12/2005 | Miriyala | 370/236 |
| 7,058,033 B1 * | 6/2006 | Dantu et al. | 370/331 |
| 7,236,475 B2 * | 6/2007 | Watanabe et al. | 370/331 |
| 2002/0058532 A1 * | 5/2002 | Snelgrove et al. | 455/557 |
| 2002/0091834 A1 | 7/2002 | Isozu et al. | |
| 2002/0122110 A1 | 9/2002 | Rasanen | |
| 2003/0125028 A1 * | 7/2003 | Reynolds | 455/437 |
| 2004/0037312 A1 * | 2/2004 | Spear | 370/465 |
| 2004/0258229 A1 * | 12/2004 | Mayron | 379/114.2 |

FOREIGN PATENT DOCUMENTS

| | | |
|---|---|---|
| EP | 0981254 | 2/2000 |
| EP | 0982961 | 3/2000 |
| EP | 1094650 | 4/2001 |
| EP | 1235455 | 8/2002 |

(Continued)

OTHER PUBLICATIONS

Trigila, et al., "Mobility in Long-Term Service Architectures and Distributed Platforms" IEEE Personal Communications. vol. 5, No. 4 (1998).

(Continued)

*Primary Examiner* — Thuong T Nguyen
(74) *Attorney, Agent, or Firm* — Charles E. Eggers

(57) ABSTRACT

A method for soft handoff across different networks is disclosed. A first communication link through a first network is used for communicating between a first user agent and a second user agent. The user agents negotiate to use a second communication link for the same call. The second communication link is established through a second network between the first user agent and the second user agent while maintaining the first communication link. Related data is sent through the first communication link and the second communication link such that the related data is for the same call. The first communication link is dropped and communication is continued using the second communication link.

57 Claims, 10 Drawing Sheets

FOREIGN PATENT DOCUMENTS

| | | |
|---|---|---|
| EP | 1370041 | 12/2003 |
| FR | EP001370041 A1 * | 7/2002 |
| JP | 10155034 | 6/1998 |
| JP | 11313377 | 11/1999 |
| JP | 12059840 | 2/2000 |
| JP | EP001235455 A1 * | 5/2000 |
| JP | 2002176432 | 2/2002 |
| JP | 2002185500 | 6/2002 |
| RU | 2144263 | 1/2000 |
| WO | 0143459 | 6/2001 |
| WO | WO 01/43459 A2 * | 6/2001 |
| WO | WO0152567 | 7/2001 |
| WO | 0158177 | 8/2001 |
| WO | WO0163944 | 8/2001 |
| WO | WO02087268 A1 | 10/2002 |
| WO | 03056797 | 7/2003 |
| WO | 03107633 | 12/2003 |
| WO | 04004378 | 1/2004 |

OTHER PUBLICATIONS

Schulzrinne, H., "Signaling for Internet Telephony" Network Protocols, (1998). Proceedings Sixth International Conference on Austin, TX USA Oct. 13-16, 1998.

International Search Report—PCT/US04/004600, International Search Authority—European Patent Office—Nov. 10, 2004.

Written Opinion—PCT/US2004/004600, International Searching Authority—European Patent Office—Nov. 10, 2004.

International Preliminary Examination Report—PCT/US2004/004600, International Preliminary Examination Authority/US—Alexandria, Virginia—Sep. 1, 2006.

Translation of Office Action in Chinese application 200480004156.1 corresponding to U.S. Appl. No. 10/366,454, citing JP10155034 and WO01052567 dated Mar. 24, 2011.

* cited by examiner

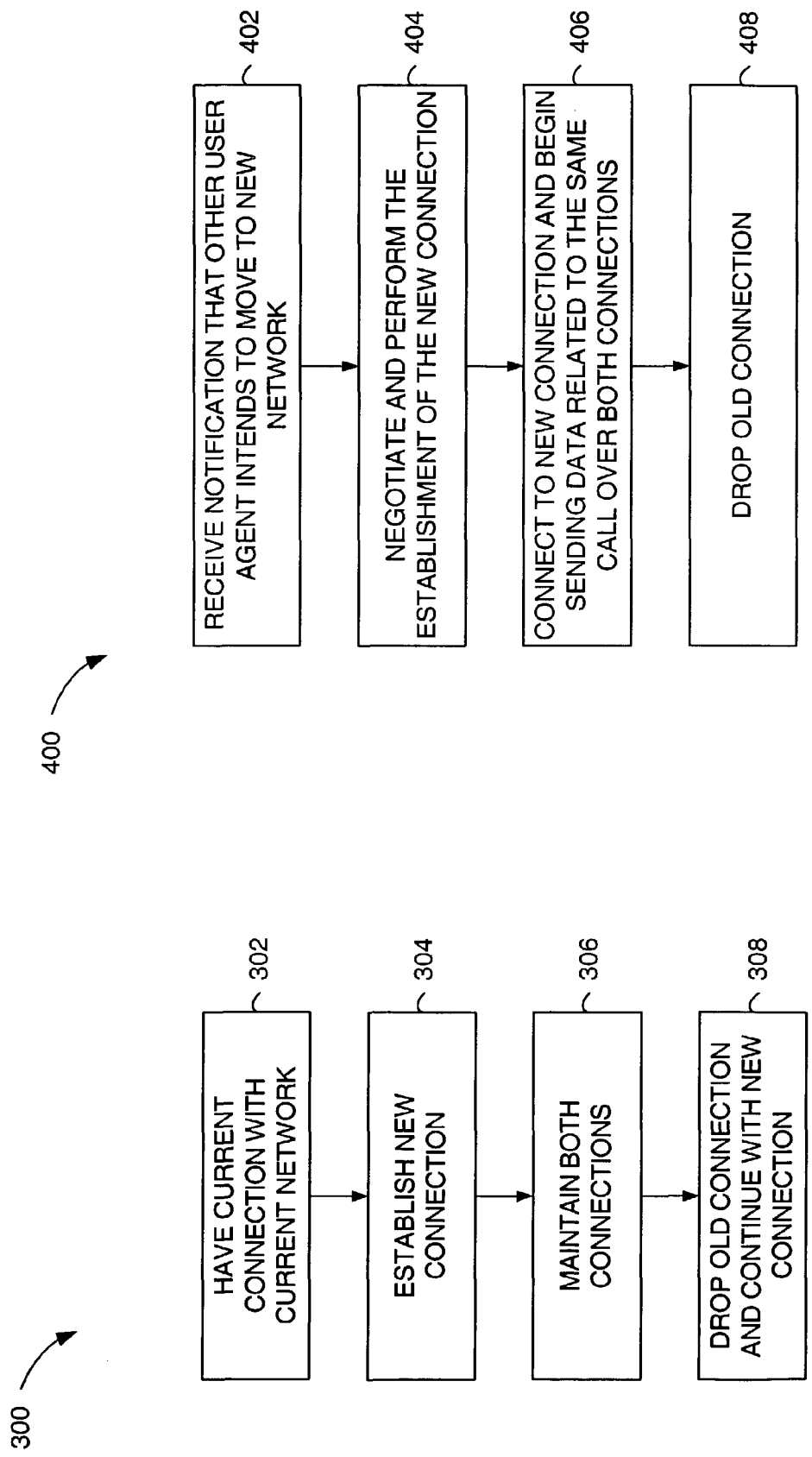

SOFT HANDOFF ACROSS DIFFERENT NETWORKS ASSISTED BY AN END-TO-END APPLICATION PROTOCOL

BACKGROUND

1. Field

The present invention relates generally to soft handoff in communications systems, and more specifically, to soft handoff across different types of communication networks assisted by an end-to-end application protocol.

2. Background

Communications systems are used for transmission of information from one device to another. Today there are many different kinds of communication devices and many different kinds of communication networks that may be used. Examples of communication devices include, but are not limited to, a telephone, a cellular phone, a desktop computer, a laptop computer, a personal digital assistant, a pager, and the like. Different communication networks include, but are not limited to, a Code Division Multiple Access (CDMA) 1x network, a Local Area Network (LAN), a wireless LAN, the Internet, a Wideband CDMA (W-CDMA) network, a General Packet Radio Service (GPRS) network, etc. As shown, a user has many options to choose from in selecting a communication system for his or her use.

With the many different communication options available to a user, there may be times when a user wishes to change the way in which he or she is achieving the communications while engaged in a current communication link. For example, the user may wish to switch networks or devices during a call or a session without losing the call or session. A call or session is a communication state shared by two or more parties that have established communication link(s) between them; one example of a call or session is a Voice over IP call. A need exists, therefore, for systems and methods to enable a user to be able to switch networks or devices during a call or a session without losing the call or session.

BRIEF DESCRIPTION OF THE DRAWINGS

FIG. 3 is a general flow diagram illustrating a method for soft handoff assisted by an end-to-end application protocol as depicted in FIG. 1;

FIG. 4 is a general flow diagram illustrating a method for soft handoff assisted by an end-to-end application protocol where the user agent is notified that another user agent desires to move to a new network;

DETAILED DESCRIPTION

Figure 1:
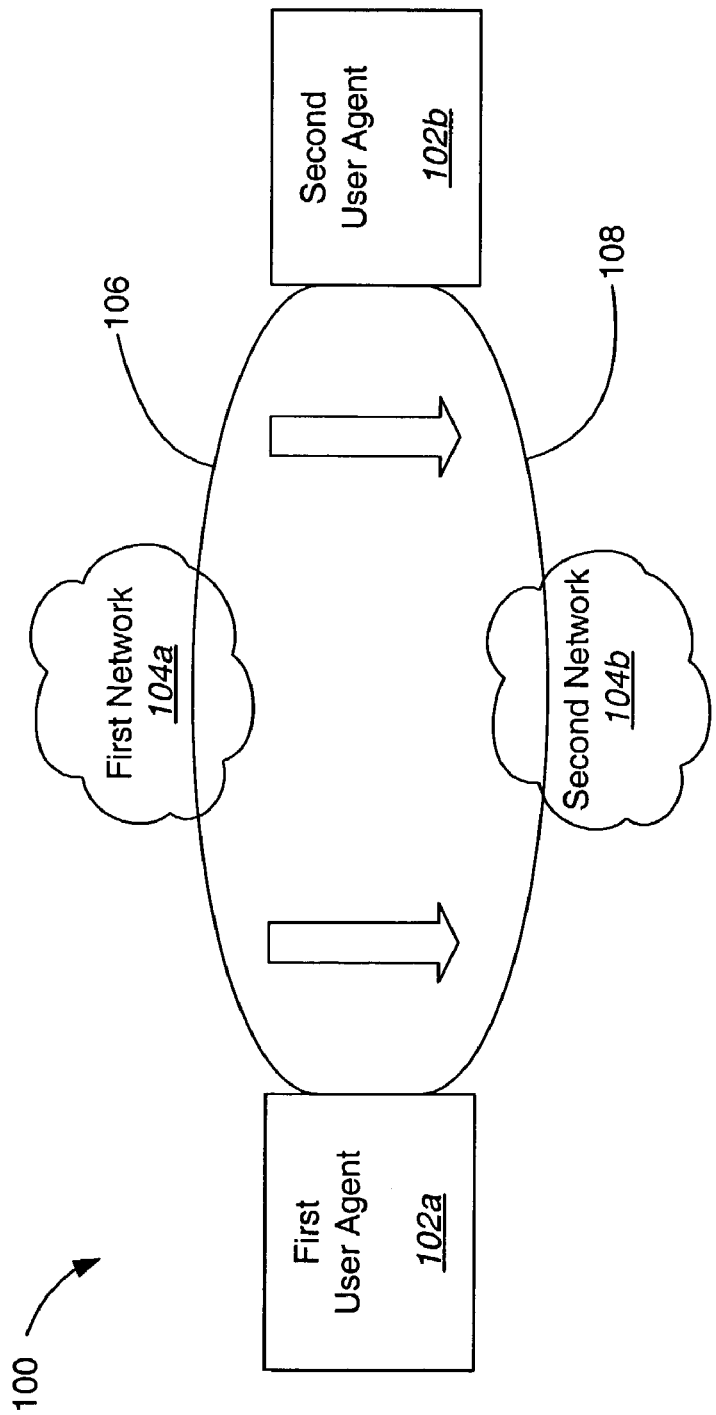
FIG. 1 is a network block diagram illustrating soft handoff assisted by an end-to-end application protocol.

There are many different electronic communication options available to a user. There may be times when a user wishes to change the way in which he or she is achieving the communications while engaged in a current communication link. For example, the user may wish to switch networks during a call or a session without losing the call or session, (e.g., the user may wish to move his or her call from a CDMA network to a wireless LAN). The systems and methods disclosed herein provide means whereby the user may switch networks during a call without losing the call. The application running on the user's communication device may perform the necessary tasks such that the user experiences no disruption during this soft handoff between different networks.

A method for soft handoff across different networks is disclosed. A first communication link through a first network is used for communicating between a first user agent and a second user agent. The user agents negotiate to use a second communication link for the same call. The second communication link is established through a second network between the first user agent and the second user agent while maintaining the first communication link. Related data is sent through the first communication link and the second communication link such that the related data is for the same call. The first communication link is dropped and communication is continued using the second communication link.

The first user agent may include an application. The application may establish the second communication link and send the related data. The related data may be various kinds of data and may be related in differing degrees. For example, in one embodiment the related data may be the same data. The data may have the same format or different formats. In another embodiment, the related data may not be identical but may include a similar signal or similar data. The related data may include voice data, multimedia data, signaling information, or any other kind of data.

The first user agent and the second user agent can negotiate the support, willingness, and call-related information to proceed with application assisted soft handoff before, during or after the establishment of the second communication link.

The networks may be any kind of communication network capable of being used by user agents to communicate. Examples of types of networks include, but are not limited to a CDMA network, a Local Area Network (LAN), a wireless LAN, a global computer network, a General Packet Radio Service (GPRS) network, a Global System for Mobile Communication (GSM) network, a Universal Mobile Telecommunications System (UMTS) network, and the Public Switched Telephone Network (PSTN).

Before the second communication link is established, the second network may be discovered. Once the second network is discovered, a user agent may determine whether the second network should be used before the second communication link is established through use of network preference criteria.

A method for soft handoff across different networks is disclosed wherein the call is transferred from one device to another. A first communication link through a first network is used for communicating between a first user agent and a second user agent. A second communication link is established through a second network between a third user agent and the second user agent while maintaining the first communication link. Related data is sent through the first communication link and the second communication link such that the first communication link and the second communication link are each being used for the same call. The first communication link is dropped and communication is continued using the second communication link between the third user agent and the second user agent.

A user agent for soft handoff across different networks is also disclosed. The user agent includes a processor and memory in electronic communication with the processor. An application is stored in the memory. The application is programmed to implement a method for accomplishing soft handoff across different networks. According to the method, a first communication link through a first network is used for communicating between a first user agent and a second user agent. A second communication link is established through a second network between the first user agent and the second user agent while maintaining the first communication link. Related data is sent through the first communication link and the second communication link such that the first communication link and the second communication link are each being used for the same call. The first communication link is dropped and communication is continued using the second communication link.

A network application gateway for soft handoff across different networks is also disclosed. The network application gateway includes a processor and memory in electronic communication with the processor. An application is stored in the memory. The application is programmed to implement a method for accomplishing soft handoff across different networks. According to the method, a first communication link is enabled by the network application gateway through a first network between a first user agent and a second user agent. A second communication link is established through a second network between the network application gateway and the first user agent while maintaining the first communication link. Related data is sent through the first communication link and the second communication link such that the first communication link and the second communication link are each being used for the same call. One communication link is maintained with the legacy user agent. The first communication link is dropped and communication is continued using the second communication link.

It will be appreciated by those skilled in the art that a computer-readable medium may be used to store the application software disclosed herein.

The word "exemplary" is used exclusively herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale unless specifically indicated.

The following discussion develops the exemplary embodiments of soft handoff across different types of communication networks assisted by an end-to-end application protocol. A network block diagram illustrates soft handoff by user agents assisted by an end-to-end application protocol. An embodiment of a mobile user agent is shown. Flow diagrams are shown that illustrate the soft handoff. The discovery of a new network and a determination whether to move to the new network is also discussed. Embodiments of network discovery settings and network preference criteria are depicted. A network application gateway may be used to allow a legacy user agent to be used with the systems and methods herein. Several diagrams show the use of the network application gateway to facilitate soft handoff assisted by an end-to-end application protocol. A block diagram illustrates call transfer from one device to another device. The method for achieving call transfer from one device to another device is discussed.

Note that the exemplary embodiment is provided as an exemplar throughout this discussion, however, alternate embodiments may incorporate various aspects without departing from the scope of the present invention. Specifically, the present invention is applicable to a data processing system, a wireless communication system, a mobile IP network and any other system desiring to receive and process a wireless signal.

FIG. 1 is a network block diagram illustrating soft handoff assisted by an end-to-end application protocol. A first user agent 102a is in electronic communication with a second user agent 102b. The initial communication link 106 is through a first network 104a. As shown, a second network 104b exists and will be facilitating communication between the user agents 102.

The first communication link 106 through the first network 104a may have originated with either user agent 102. For purposes of this discussion, it is assumed that the first user agent 102a has become aware of the second network 104b and intends to transfer the communication from the first communication link 106 to a second communication link 108. The systems and methods disclosed herein allow the first user agent 102a to move from the first network 104a to the second network 104b while continuing to communicate with the second user agent 102b. The system may operate such that the communication link is maintained regardless of the types and administrative domains of the two networks, as long as the users are authorized to use each of the two networks. This is accomplished through use of a soft handoff assisted by an end-to-end application layer protocol.

In an embodiment of a user agent 102, the user agent 102 may be communicating through use of application software (shown in FIG. 2) on the user agent 102. When the application on one user agent 102 decides to handoff the communication link to a new network 104b, the user agent 102 signals to the application on the other end to set up a new communications link 108 through the new network 104b. When the new link 108 is up, the applications on both ends start to use the new link 108 and release the old link 106. When the new link 108 is up, the same information or data is being sent over both links 106, 108 for a period of time. Thus, conferencing or mixing is not needed. The user agent 102 may either use one link or the other, but the different links are not mixed together as is often the case in a conferencing context.

Given adequate application synchronization support, the handoff may be lossless. In addition, soft handoff may be possible without the need for the underlying networks 104 to be aware of the handoff. The handoffs may be between different types of networks 104; for example, a circuit switched link can be handed off to a packet switched link.

The communication networks 104 may be any kind of communication networks capable of transmitting communications between user agents 102. Examples of possible networks 104 include, but are not limited to, a CDMA 1x network, a Local Area Network (LAN), a wireless LAN, the Internet (also referred to as a global computer network), a W-CDMA network, a GPRS network, a GSM network, a UMTS network and the PSTN.

The communications being sent between user agents 102 may be voice or data. Multimedia sessions may also be handled with the present systems and methods.

Figure 2:
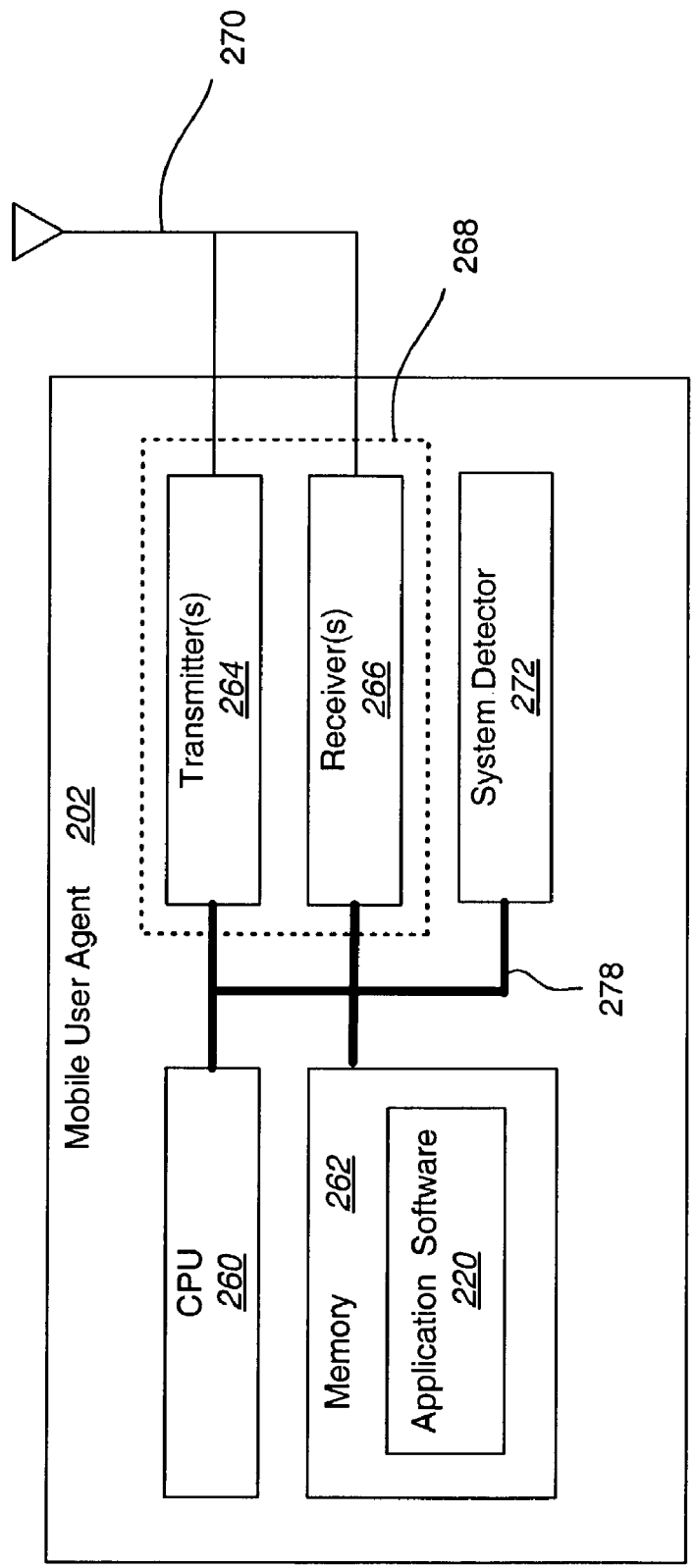
FIG. 2 is a block diagram of certain components in an embodiment of a user agent for a case where the user agent is in a mobile terminal.

FIG. 2 is a block diagram of certain components in an embodiment of a mobile user agent 202. In the embodiment shown in FIG. 2, the communication device 202 is a mobile terminal that is capable of being connected to a radio access network. The user agent 102 may also be embodied in a desktop computer, a non-mobile telephone, a laptop computer, a personal digital assistant, a cellular phone, etc. The user agent 202 is broadly defined as any electronic device capable of facilitating communications through use of a communication network 104. The mobile user agent 202 shown in FIG. 2 is only one possible embodiment out of many embodiments of user agents 202. In addition, the term user agent 202 also includes the aforementioned devices without necessarily having a user present at the user agent 202. For example, the user agent 202 may be a computer hosting a web site, and a far end user may be accessing and communicating with the web site user agent 202.

As shown, the mobile user agent 202 includes a central processing unit (CPU) 260, which controls operation of the user agent 202. A memory 262, which may include both read-only memory (ROM) and random access memory (RAM), provides instructions and data to the CPU 260. A portion of the memory 262 may also include non-volatile random access memory (NVRAM). Depending on the type of use agent 202 being used, the memory 262 may include other storage devices such as a hard drive, a removable drive, etc.

The memory stores application software 220 for implementing the systems and methods disclosed herein. At different times, the CPU 260 (also referred to as the processor 260) may be executing the application software 220 to carry out the systems and methods herein. Of course, it will be appreciated by those skilled in the art that the application software 220 for implementing the disclosed systems and methods may be integrated with a larger program for controlling the user agent 202. As a result, the application software 220 may be a distinct module, it may be part of another module, or it may include several different modules. In addition, specialized hardware may be used to implement the systems and methods herein.

The mobile user agent 202 also includes a transmitter 264 and a receiver 266 to allow transmission and reception of data between the user agent 202 and a remote location, such as a cell site controller or base station 1004. The mobile user agent 202 may have more than one transmitter 264 and more than one receiver 266. The transmitter 264 and receiver 266 may be combined into a transceiver 268. An antenna 270 is electrically coupled to the transceiver 268. The operation of the transmitter 264, receiver 266, and antenna 270 is well known in the art and need not be described herein.

The mobile user agent 202 also includes a signal detector 272 used to detect and quantify the level of signals received by the transceiver 268. The signal detector 272 detects such signals as total energy, pilot energy per pseudorandom noise (PN) chips, power spectral density, and other signals, as is known in the art.

The various components of the mobile terminal 202 are coupled together by a bus system 278 which may include a power bus, a control signal bus, and a status signal bus in addition to a data bus. However, for the sake of clarity, the various busses are illustrated in FIG. 2 as the bus system 278.

A general flow diagram is shown in FIG. 3 illustrating a general method 300 for soft handoff assisted by an end-to-end application protocol as depicted in FIG. 1. Two user agents 102 have 302 an established communication link 106 through use of a first network 104a. The first user agent 102a intends to use a different network 104b for communicating with the second user agent 102b to continue the same call. The term "call" as used herein is defined as the communication between user agents 102. The call may be a voice call, an exchange of data, a multimedia session, etc. To continue the same call means that the user agents will be able to continue with whatever type of communication was taking place. For example, if users were talking, to continue the same call would mean that the users would be able to continue their conversation uninterrupted. If the a user was exchanging data, either uploading or downloading or both, to continue the same call would mean that the user would be able to continue the data exchange uninterrupted.

The first user agent 102a establishes 304 a new communication link 108 via the new network 104b with the second user agent 102b. When establishing a new connection, the first user agent 102a indicates to the second user agent 102b that it is the same call or information that is going to be communicated over the new link (i.e., that it is going to be the same call). The first user agent 102a continues to maintain 306 both connections 106, 108 until the new connection 108 using the new network 104b is ready for use. For a period of time, there are two connections or communication links with the same or substantially similar information being transmitted through the two links. Then the old connection 106 through the first network 104a may be dropped 308 and the new connection 108 through the new network 104b is maintained and communications continue through the new network connection 108.

Either user agent 102 may initiate the new communication link. Although in FIGS. 1 and 3, for the sake of example, the first user agent 102a initiated the new link 108 over the second network 104b, it should be understood that the second user agent 102b may also initiate a new link after which a soft handoff may be performed.

A general flow diagram is shown in FIG. 4 illustrating a general method 400 for soft handoff where the user agent 102b is notified that another user agent 102a desires to move to a new network. The user agent 102b is notified 402 that the other user agent 102a desires to use a different network 104b for communicating the same call. The user agents 102a, 102b then negotiate and perform 404 the establishment of the new connection. The user agents may negotiate the support, willingness, and call-related information to proceed with application assisted soft handoff before, during or after the establishment of the second communication link. Then the user agent 102b connects 406 to the new connection 108 and begins sending data related to the same call over both connections 106, 108. The user agent 102b continues to maintain the old connection 106 until the new connection 108 using the new network 104b is ready for use. The user agent 102b may receive a message from the other user agent 102a indicating that the old connection 106 through the first network 104a may be dropped 408 and the new connection 108 through the new network 104b is maintained and communications continue through the new network connection 108.

Figure 5:
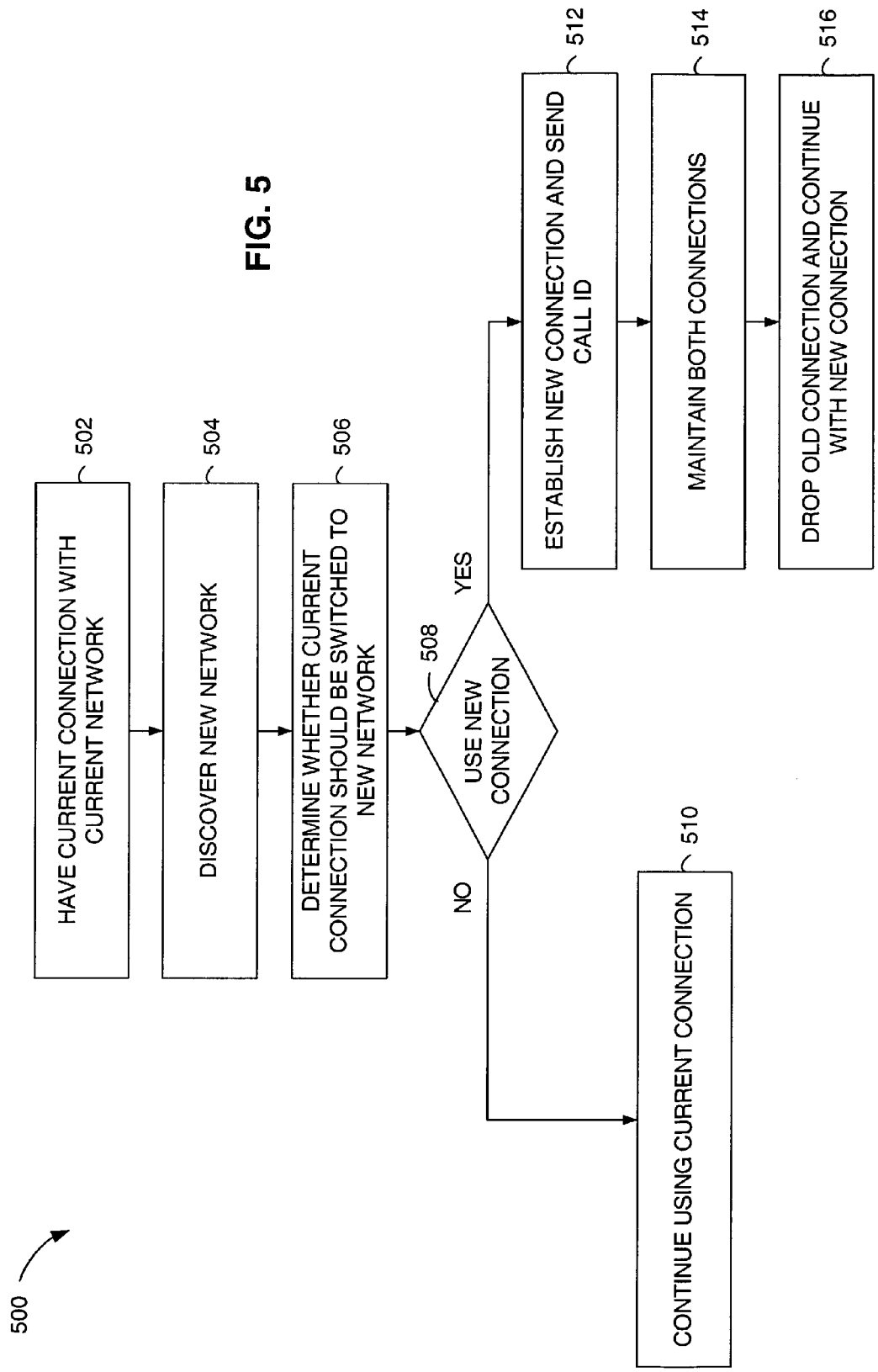
FIG. 5 is a flow diagram illustrating discovery of a new network and a determination whether to move to the new network.

FIG. 5 is a flow diagram 500 illustrating discovery of a new network 104b and a determination whether to move to the new network 104b. The user agent 102a is currently within a first network 104a and has 502 a communication link 106 with a second user agent 102b. The first user agent 102a discovers 504 a new network 104b. The first user agent 102a then determines 506 whether the current connection should be switched to the new network 104b based on network preference criteria, discussed below. The network preference criteria may be used to determine whether the new network 104b should be used. If 508 the new network 104b is not to be used, the user agent 102a may log the decision not to use the new network 104b and continue 510 normal operations with the current network 104*a* and the current communication link 106. If the new network 104*b* and the new communication link 108 are to be used, the user agent 102*a* establishes 512 a new communication link 108 with the second user agent 102*b* via the new network 104*b*. In establishing 512 the new connection, the first user agent 102*a* identifies the first communication link 106 by sending a call identification (call ID) to the second user agent 102*b*. The call ID is an identification that is used to identify a specific communication leg and is not meant to limit the systems and methods herein to a specific type of network or type of communication.

The user agents 102*a*, 102*b* continue to maintain 514 both communication links 106, 108 until the new communication link 108 using the new network 104*b* is ready for use. Then the old connection 106 through the first network 104*a* may be dropped 516 and the new communication link 108 or connection 108 through the new network 104*b* is maintained and communications continue through the new network connection 108.

Figure 6:
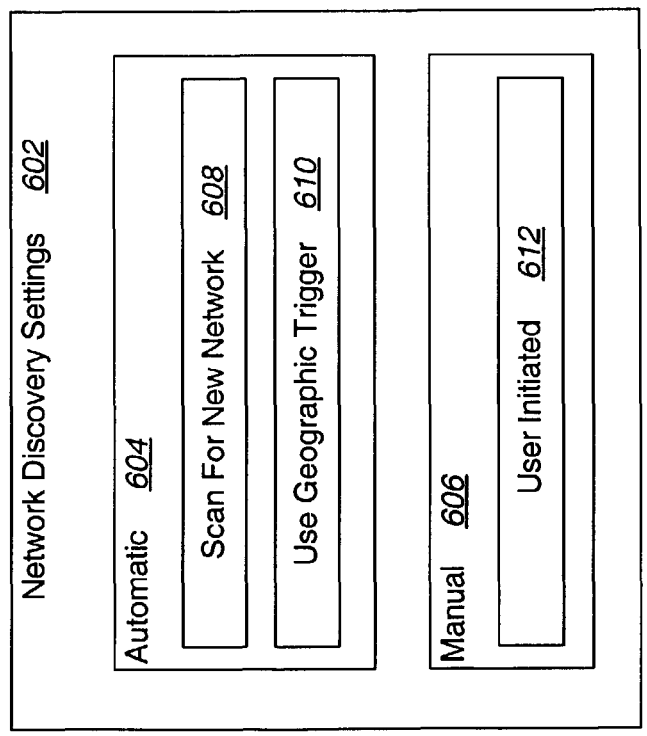
FIG. 6 is a block diagram illustrating an embodiment of network discovery settings.

FIG. 6 is a block diagram illustrating an embodiment of network discovery settings 602. The network discovery settings 602 define how a new network 104 is to be discovered. As shown, the network discovery may be automatic 604 or it may be made manually 606 by a user. If there are automatic network discovery settings 604, the user agent 102 automatically scans for and/or discovers new networks 104 without user intervention. If the network discovery setting is manual 606, user intervention may be required.

Automatic settings 604 may include scan for new network data 608 and/or use geographic trigger data 610. The scan for new network data 608 configures the user agent 102 to scan for newly available networks by using various means as known by those skilled in the art. The use geographic trigger data 610 configures the user agent 102 to use new networks 104 based on geographic location and settings.

If the manual network discovery setting 606 is used, the use of a new network 104 may be user initiated. For example, if a user becomes aware of a wireless LAN in the user's area, the user may manually cause the user agent 102 to transfer its communication link to the wireless LAN.

Figure 7:
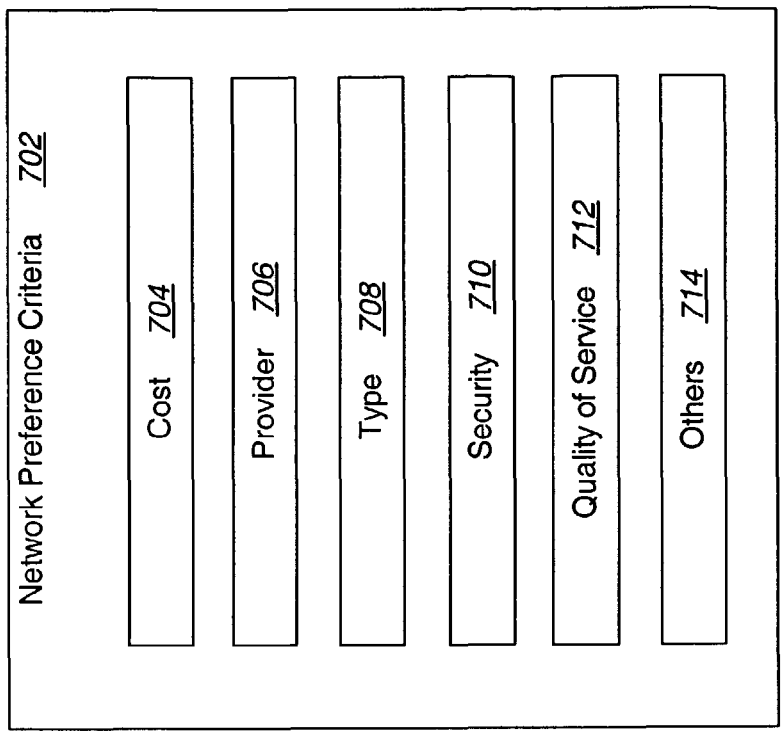
FIG. 7 is a block diagram of an embodiment of network preference criteria.

FIG. 7 is a block diagram of an embodiment of network preference criteria 702. Network preference criteria 702 may include, but are not limited to, cost 704, provider 706, type 708, security 710, quality of service 712 and/or other 714 items. The cost 704 criteria may be used to configure a user agent 102 to switch to new networks 104 based on cost. The switch based on cost may be automatic or it may require user confirmation. One possible use of cost 704 criteria may be to cause the user agent 102 to switch to the cheapest network 104 available.

The provider 706 criteria may be used to configure a user agent 102 to switch to new networks 104 based on the providers of the networks 104. The switch based on the provider may be automatic or it may require user confirmation. One possible use of provider 706 criteria may be to cause the user agent 102 to switch to a particular provider if one of its networks 104 is available.

The type 708 criteria may be used to configure a user agent 102 to switch to new networks 104 based on the type of networks 104. The switch based on the type may be automatic or it may require user confirmation. One possible use of type 708 criteria may be to cause the user agent 102 to switch to a particular type of network (e.g., a wireless LAN) if one is available.

The security 710 criteria may be used to configure a user agent 102 to switch to a new network 104*b* based on the security support of the networks 104. The quality of service 712 criteria may be used to configure a user agent 102 to switch to a new network 104*b* based on the quality of service support (bandwidth, delay, etc.) of the networks 104.

It should be appreciated by those skilled in the art that other 714 network preference criteria 702 may be used. In addition, the user agent 102 may use a combination of criteria 702 to determine when to switch to a new network 104.

Figure 8:
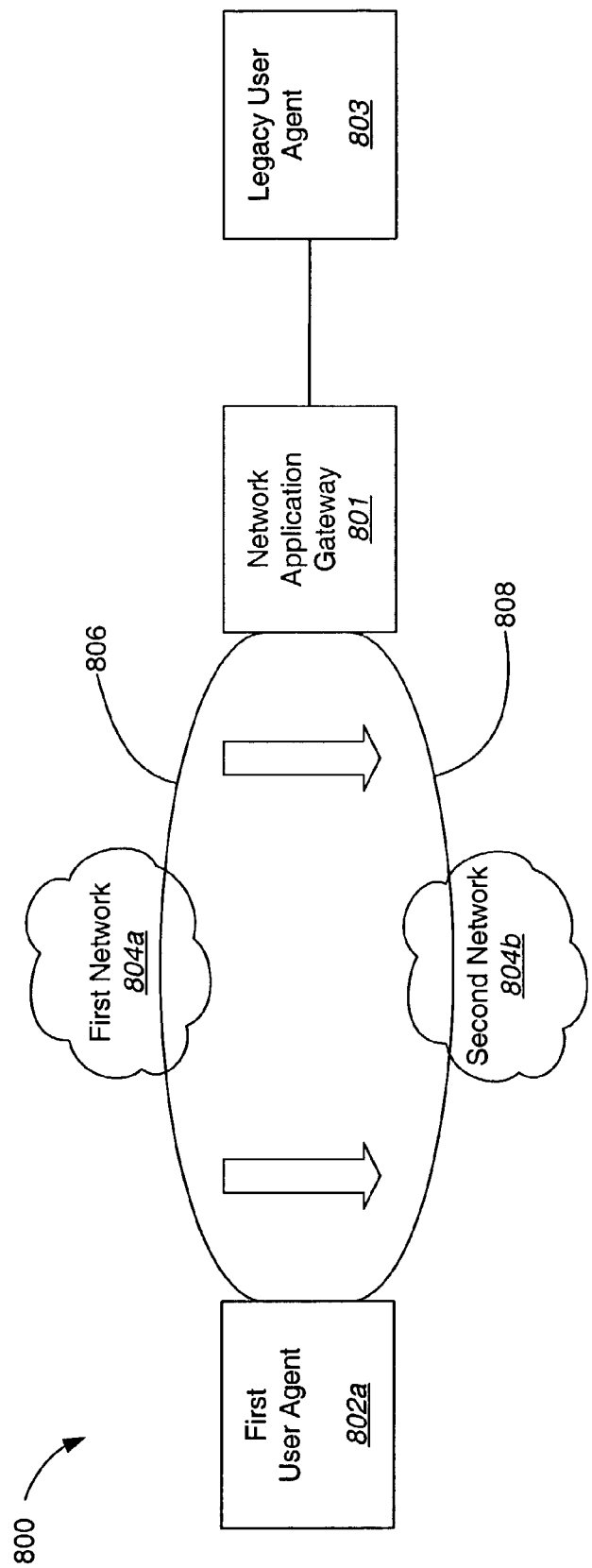
FIG. 8 is a block diagram of a system using a network application gateway to facilitate soft handoff assisted by an end-to-end application protocol.

FIG. 8 is a block diagram of a system 800 using a network application gateway 801 to facilitate soft handoff assisted by an end-to-end application protocol. The first user agent 802*a* has been configured for soft handoff assisted by an end-to-end application protocol according to the systems and methods described herein. The legacy user agent 803 shown in FIG. 8 has not been configured for soft handoff assisted an by end-to-end application protocol. The network application gateway 801 facilitates the transfer of the connection from the first network 804*a* to the second network 804*b* for the legacy user agent 803. The network application gateway 801 includes the functionality as discussed in relation to FIGS. 1-7 to enable soft handoff to a new network. In addition, the network application gateway 801 passes through the active connection to the legacy user agent 803. The network application gateway 801 may be located at the border between an IP network and an access network. Since the network application gateway 801 would be able to communicate with both circuit switched networks and packet switched networks, it may be located on the core network.

Figure 9:
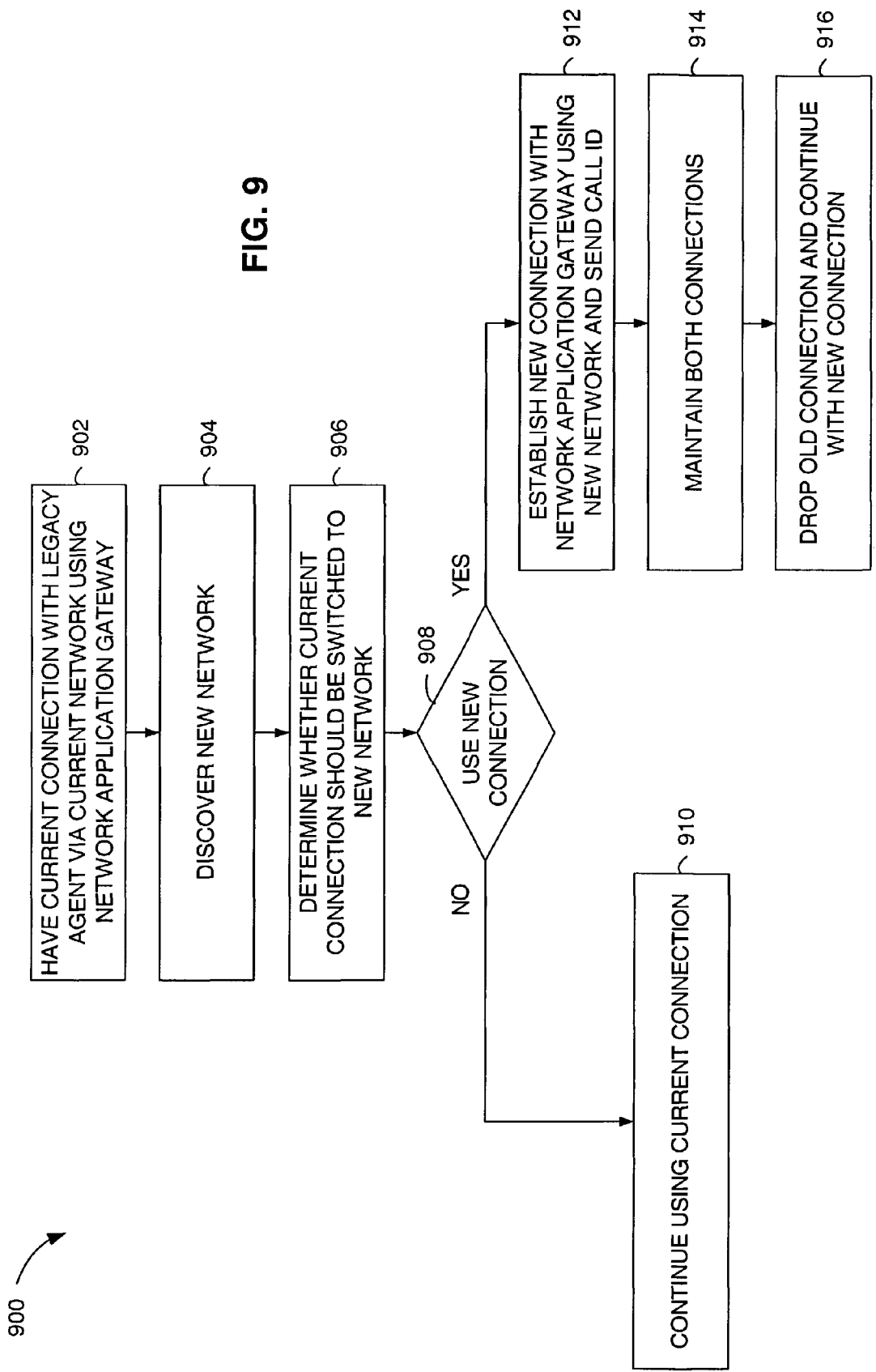
FIG. 9 is a flow diagram illustrating a method for using a network application gateway to facilitate soft handoff assisted by an end-to-end application protocol.

FIG. 9 is a flow diagram illustrating a method for using a network application gateway 801 to facilitate soft handoff assisted by an end-to-end application protocol. The user agent 802*a* is currently within a first network 804*a* and has 902 a communication link with the legacy user agent 803 via the network application gateway 801. The user agent 802*a* discovers 904 a new network 804*b*. The user agent 802*a* then determines 906 whether the current connection should be switched to the new network 804*b* based on network preference criteria 702. If 908 the new network 804*b* is not to be used, the user agent 802*a* may log the decision not to use the new network 804*b* and 910 continue normal operations with the current network 804*a* and the current communication link. If the new network 804*b* and the new communication link are to be used, the user agent 802*a* establishes 912 a new communication link 808 with the network application gateway 801 via the new network 804*b*. In establishing 912 the new connection, the user agent 802*a* identifies the first communication link 806 by sending a call ID to the network application gateway 801.

The user agent 802*a* continues to maintain 914 both communication links 806, 808 until the new communication link 808 using the new network 804*b* is ready for use. Then the old connection 806 through the first network 804*a* may be dropped 916 and the new communication link 808 or connection 808 through the new network 804*b* is maintained and communications continue through the new network connection 808. The network application gateway 801 passes the active communication link through to the legacy user agent 803. Thus, a user agent 802*a* is able to switch to a new network 804*b* and maintain the same call with the legacy user agent 803 even though the legacy user agent 803 has not been configured to facilitate soft handoff to a new network. This functionality is provided by the network application gateway 801.

Figure 10:
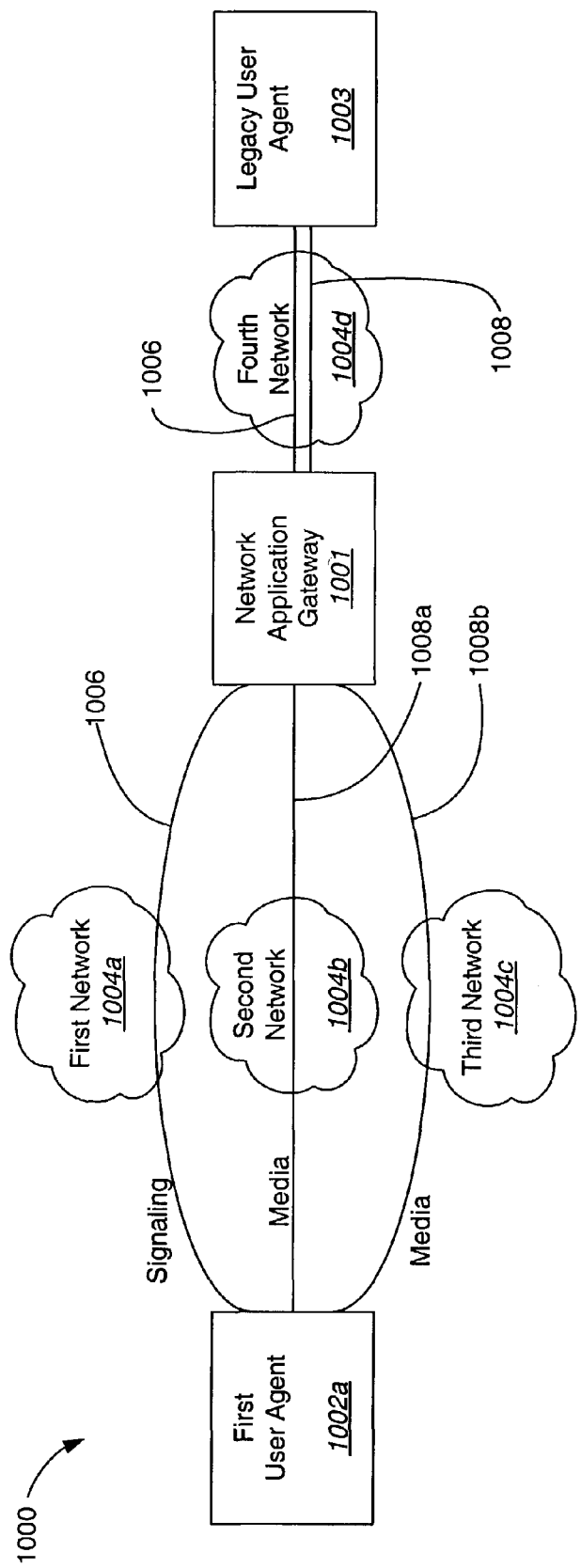
FIG. 10 is a block diagram of another embodiment of a system using a network application gateway to facilitate soft handoff assisted by an end-to-end application protocol.

FIG. 10 is a block diagram of another embodiment of a system using a network application gateway 1001 to facilitate soft handoff assisted by an end-to-end application protocol. The network application gateway 1001 receives two media streams 1008*a*, 1008*b* from two different networks 1004*b*, 1004c. As shown in FIG. 10, the signaling 1006 may be communicated via the first network 1004a. The network application gateway 1001 may choose to use streams from one of the networks 1004; especially, since it knows that the media streams 1008 from the two different networks 1004b, 1004c are the same. When the first user agent 1002a moves completely into one of the networks 1004 or when one of the networks 1004 fade, the first user agent 1002a may terminate the fading session and continue the call through the new network. The network application gateway 1001 may send the signaling and media streams 1006, 1008 through an additional network 1004d.

Figure 11:
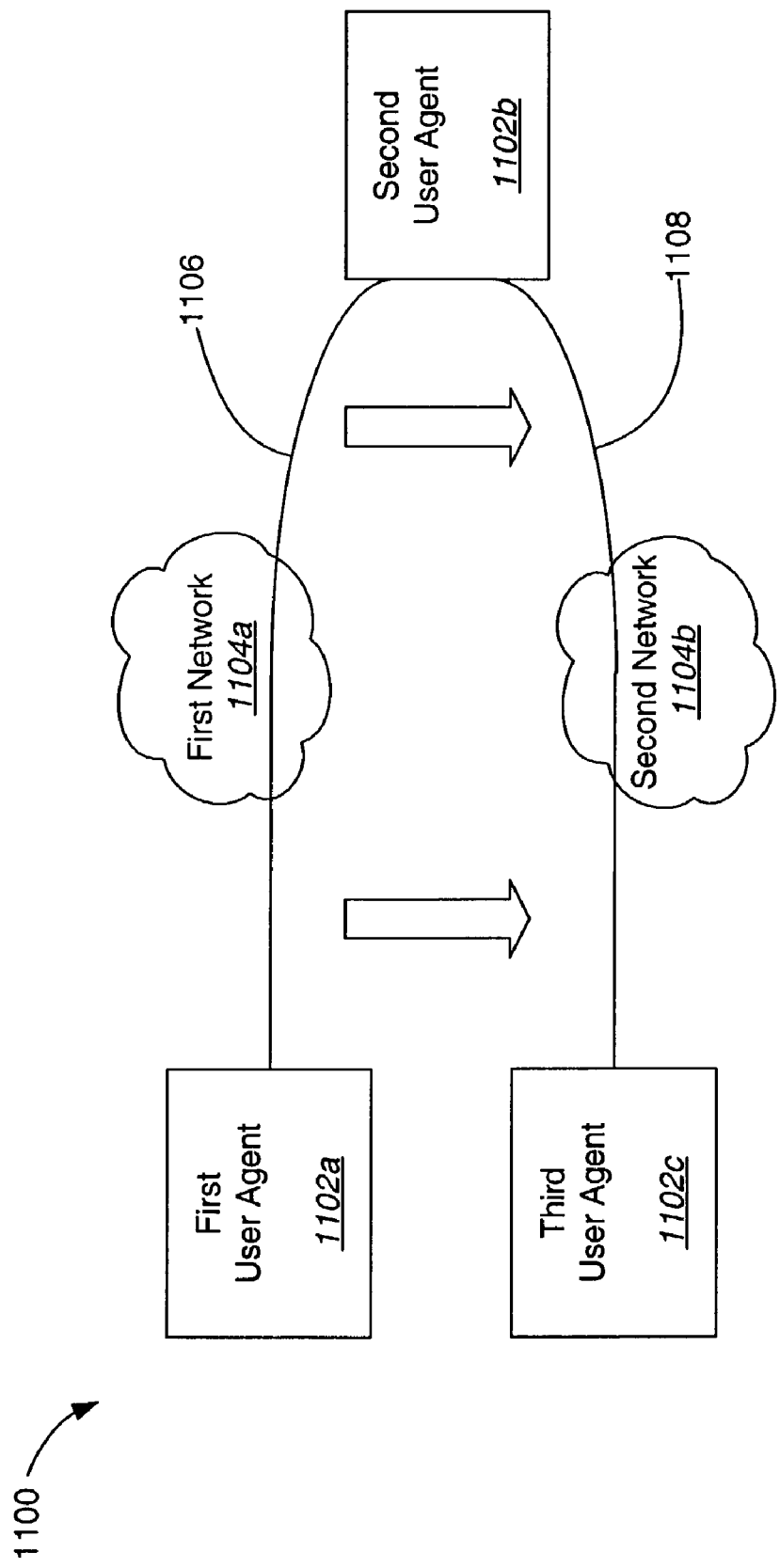
FIG. 11 is a block diagram illustrating call transfer from one device to another device.

FIG. 11 is a block diagram illustrating call transfer from one device to another device. Assume that a user agent 1102a is engaged in a current communication link 1106 connection via a first network 1104a to a second user agent 1102b. Then the user wants to transfer the same call to a third user agent 1102c. For example, the user may be using a desktop computer for the connection and wishes to transfer the connection to his or her cell phone to continue the call or session. Through the method shown in FIG. 12, the user may transfer the call from one device to another and continue to be engaged in the call or session.

Figure 12:
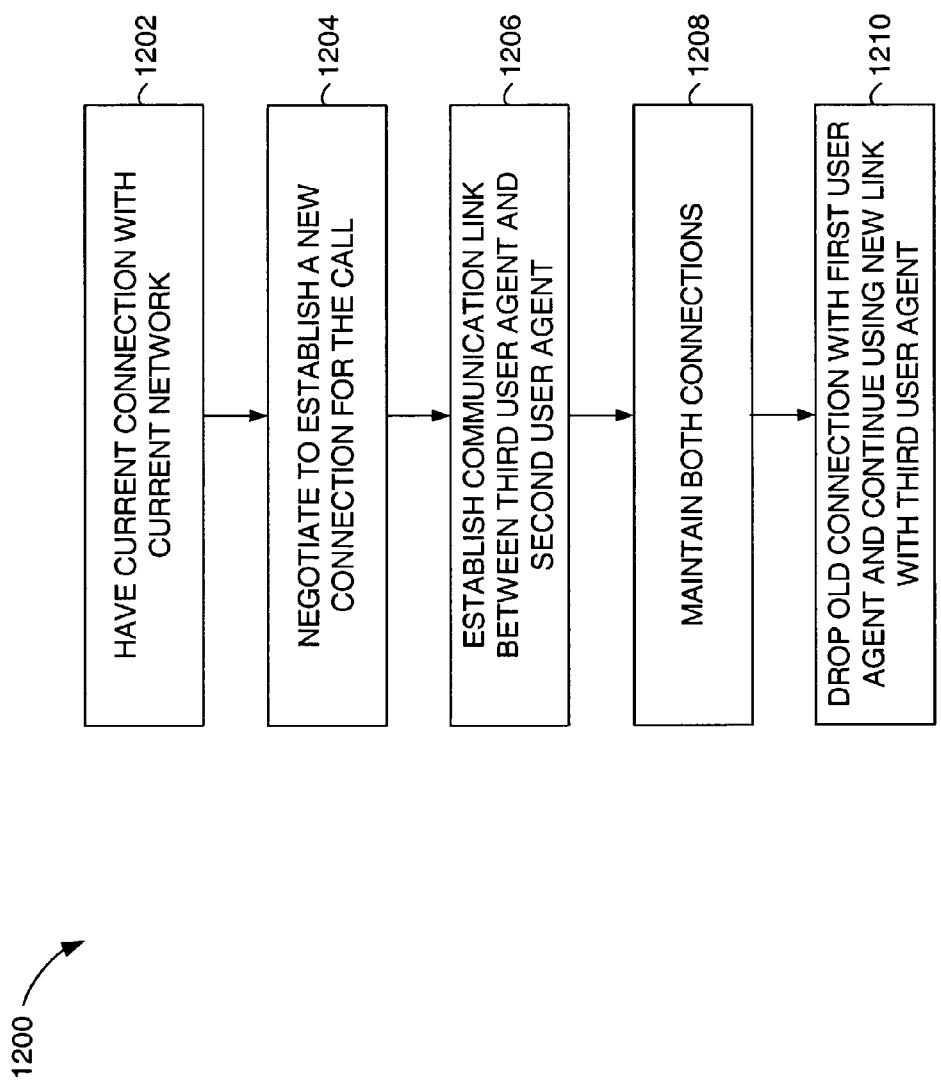
FIG. 12 is a flow diagram illustrating call transfer from one device to another device as depicted in FIG. 11.

FIG. 12 is a flow diagram illustrating call transfer from one device to another device as depicted in FIG. 11. The first user agent 1102a is currently engaged 1202 in a communication link 1106 with the second user agent 1102b and desires to transfer the communication link to a third user agent 1102c. The user agents 1102a, 1102b negotiate 1204 to establish a new connection for the call using the third user agent 1102c and that the new connection is to be the same call as the current call. The third user agent 1102c then establishes 1206 a communication link with the second user agent 1102b. The second user agent 1102b transmits the same information/media to the first user agent 1102a and the third user agent 1102c. The second user agent 1102b receives two sets of media, one from the first user agent 1102a and one from the third user agent 1102c. The second user agent 1102b may choose to use one of the media sets and ignore the other. Typically for a period of time both communication links 1106, 1108 will be maintained 1208 until the user agent 1102 is ready to end the first communication link 1106. Once the second communication link has been established 1206 and maintained 1208, the first user agent 1102a may end 1210 the first communication link 1106. The user will continue the call with the third user agent 1102c through the new communication link 1108.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method, operable by a first user terminal, for communicating across different networks, the method comprising:
   communicating in a call between the first user terminal and a second user terminal using a first communication link through a first network;
   negotiating between the first user terminal and the second user terminal to use a second communication link through a second network for the call, wherein the call originates at one of the first user terminal and the second user terminal;
   determining that the second network is preferred over the first network based on at least one of network preference criteria;

establishing the second communication link through the second network between the first user terminal and the second user terminal while maintaining the first communication link through the first network between the first user terminal and the second user terminal;

sending related data through the first communication link in the first network and through the second communication link in the second network such that the related data is for the call;

dropping the first communication link; and continuing the call using the second communication link.

2. The method as defined in claim 1, wherein the first user terminal comprises an application and wherein the application performed the establishing of the second communication link and the sending of the related data.

3. The method as defined in claim 1, wherein the related data has the same data format.

4. The method as defined in claim 1, wherein the related data has different data formats.

5. The method as defined in claim 1, wherein the related data is voice data.

6. The method as defined in claim 1, wherein the related data is multimedia data.

7. The method as defined in claim 1, wherein the related data comprises signaling information for the call.

8. The method as defined in claim 1, wherein the second user terminal is receiving the related data from the first communication link and the second communication link, and wherein the second user terminal uses the related data from only one of the communication links.

9. The method as defined in claim 1, wherein the first network and the second network are each a network selected from the group consisting of a CDMA network, a Local Area Network (LAN), a wireless LAN, a global computer network, a General Packet Radio Service (GPRS) network, a Global System for Mobile Communication (GSM) network, a Universal Mobile Telecommunications System (UMTS) network, and the Public Switched Telephone Network (PSTN).

10. The method as defined in claim 1, further comprising discovering the second network before the second communication link is established.

11. The method as defined in claim 1, wherein the second user terminal comprises a legacy user terminal and wherein a network application gateway facilitates the soft handoff from the first network to the second network.

12. The method as defined in claim 1, wherein the negotiating is performed before the establishing of the second communication link.

13. The method as defined in claim 1, wherein the negotiating is performed during the establishing of the second communication link.

14. The method as defined in claim 1, wherein the negotiating is performed after the establishing of the second communication link.

15. A method, operable by a network application gateway, for communicating across different networks, the method comprising:

communicating in a call between a first user terminal and a second user terminal using a first communication link through a first network;

negotiating between the first user terminal and the second user terminal to use a second communication link through a second network for the call, wherein the call originates at one of the first user terminal and the second user terminal;

determining that the second network is preferred over the first network based on at least one of network preference criteria;

establishing the second communication link through the second network between a third user terminal and the second user terminal while maintaining the first communication link through the first network between the first user terminal and the second user terminal;

sending related data through the first communication link in the first network and through the second communication link in the second network such that the related data is for the call;

dropping the first communication link; and continuing the call using the second communication link between the third user terminal and the second user terminal.

16. A first user terminal for communicating across different networks, the first user terminal comprising:

a processor; and a memory coupled to the processor cooperatively configured to:

communicate in a call with a second user terminal using a first communication link through a first network;

negotiate with the second user terminal use of a second communication link through a second network for the call, wherein the call originates at one of the first user terminal and the second user terminal;

determine that the second network is preferred over the first network based on at least one of network preference criteria;

establish the second communication link through the second network between the first user terminal and the second user terminal while maintaining the first communication link through the first network with the second user terminal;

send related data through the first communication link in the first network and through the second communication link in the second network such that the related data is for the call;

drop the first communication link; and continue the call using the second communication link.

17. The first user terminal as defined in claim 16, wherein the related data has the same data format.

18. The first user terminal as defined in claim 16, wherein the related data has different data formats.

19. The first user terminal as defined in claim 16, wherein the related data is voice data.

20. The first user terminal as defined in claim 16, wherein the related data is multimedia data.

21. The first user terminal as defined in claim 16, wherein the related data comprises signaling information for the call.

22. The first user terminal as defined in claim 16, wherein the first network and the second network are each a network selected from the group consisting of a CDMA network, a Local Area Network (LAN), a wireless LAN, a global computer network, a General Packet Radio Service (GPRS) network, a Global System for Mobile Communication (GSM) network, a Universal Mobile Telecommunications System (UMTS) network, and the Public Switched Telephone Network (PSTN).

23. The first user terminal as defined in claim 16, wherein the memory coupled to the processor being further configured to discover the second network before the second communication link is established.

24. The first user terminal as defined in claim 16, wherein the second user terminal comprises a legacy user terminal and wherein the memory coupled to the processor being further configured to communicate with a network application gateway that facilitates the soft handoff from the first network to the second network.

25. The first user terminal as defined in claim 16, wherein the memory coupled to the processor being further configured to negotiate before the establishing of the second communication link.

26. The first user terminal as defined in claim 16, wherein the memory coupled to the processor being further configured to negotiate during the establishing of the second communication link.

27. The first user terminal as defined in claim 16, wherein the memory coupled to the processor being further configured to negotiate after the establishing of the second communication link.

28. A network application gateway for communicating across different networks, the network application gateway comprising:
   a processor;
   a memory coupled to the processor cooperatively configured to:
      enable communications in a call between a first user terminal and a legacy user terminal using a first communication link through a first network;
      negotiate between the first user terminal and the legacy user terminal to use a second communication link through a second network for the call, wherein the call originates at one of the first user terminal and the legacy user terminal;
      determine that the second network is preferred over the first network based on at least one of network preference criteria;
      establish the second communication link through the second network between the first user terminal and the legacy user terminal while maintaining the first communication link through the first network between the first user terminal and the legacy user terminal;
      send related data through the first communication link in the first network and through the second communication link in the second network such that the related data is for the call, while maintaining one communication link with the legacy user terminal;
      drop the first communication link; and
      continue the call using the second communication link.

29. A non-transitory computer-readable medium for storing program data, wherein the program data comprises executable instructions for implementing a method in a communication device, the method comprising:
   communicating in a call between a first user terminal and a second user terminal using a first communication link through a first network;
   negotiating between the first user terminal and the second user terminal to use a second communication link through a second network for the call, wherein the call originates at one of the first user terminal and the second user terminal;
   determining that the second network is preferred over the first network based on at least one of network preference criteria;
   establishing the second communication link through the second network between the first user terminal and the second user terminal while maintaining the first communication link through the first network between the first user terminal and the second user terminal;
   sending related data through the first communication link in the first network and through the second communication link in the second network such that the related data is for the call;
   dropping the first communication link; and
   continuing the call using the second communication link.

30. The computer-readable medium as defined in claim 29, wherein the related data has the same data format.

31. The computer-readable medium as defined in claim 29, wherein the related data has different data formats.

32. The computer-readable medium as defined in claim 29, wherein the related data is voice data.

33. The computer-readable medium as defined in claim 29, wherein the related data is multimedia data.

34. The computer-readable medium as defined in claim 29, wherein the related data comprises signaling information for the call.

35. The computer-readable medium as defined in claim 29, wherein the second user terminal is receiving the related data from the first communication link and the second communication link, and wherein the second user terminal uses the related data from only one of the communication links.

36. The computer-readable medium as defined in claim 29, wherein the first network and the second network are each a network selected from the group consisting of a CDMA network, a Local Area Network (LAN), a wireless LAN, a global computer network, a General Packet Radio Service (GPRS) network, a Global System for Mobile Communication (GSM) network, a Universal Mobile Telecommunications System (UMTS) network, and the Public Switched Telephone Network (PSTN).

37. The computer-readable medium as defined in claim 29, further comprising discovering the second network before the second communication link is established.

38. The computer-readable medium as defined in claim 29, wherein the second user terminal comprises a legacy user terminal and wherein a network application gateway facilitates the soft handoff from the first network to the second network.

39. The computer-readable medium as defined in claim 29, wherein the negotiating is performed before the establishing of the second communication link.

40. The computer-readable medium as defined in claim 29, wherein the negotiating is performed during the establishing of the second communication link.

41. The computer-readable medium as defined in claim 29, wherein the negotiating is performed after the establishing of the second communication link.

42. A non-transitory computer-readable medium for storing program data, wherein the program data comprises executable instructions for implementing a method in a communication device, the method comprising:
   communicating in a call between a first user terminal and a second user terminal using a first communication link through a first network;
   negotiating between the first user terminal and the second user terminal to use a second communication link through a second network for the call, wherein the call originates at one of the first user terminal and the second user terminal;
   determining that the second network is preferred over the first network based on at least one of network preference criteria;
   establishing the second communication link through the second network between a third user terminal and the second user terminal while maintaining the first communication link through the first network between the first user terminal and the second user terminal;

sending related data through the first communication link in the first network and through the second communication link in the second network such that the related data is for the call;

dropping the first communication link; and continuing the call using the second communication link between the third user terminal and the second user terminal.

43. A first communication device for communicating across different networks, the first communication device comprising:

means for communicating in a call with a second communication device using a first communication link through a first network;

means for negotiating with the second communication device to use a second communication link through a second network for the call, wherein the call originates at one of the first communication device and the second communication device;

means for determining that the second network is preferred over the first network based on at least one of network preference criteria;

means for establishing the second communication link through the second network with the second communication device while maintaining the first communication link through the first network with the second communication device;

means for sending related data through the first communication link in the first network and through the second communication link in the second network such that the related data is for the call;

means for dropping the first communication link; and means for continuing the call using the second communication link.

44. The first communication device as defined in claim 43, wherein the first communication device comprises an application and wherein the application performed the establishing of the second communication link and the sending of the related data.

45. The first communication device as defined in claim 43, wherein the related data has the same data format.

46. The first communication device as defined in claim 43, wherein the related data has different data formats.

47. The first communication device as defined in claim 43, wherein the related data is voice data.

48. The first communication device as defined in claim 43, wherein the related data is multimedia data.

49. The first communication device as defined in claim 43, wherein the related data comprises signaling information for the call.

50. The first communication device as defined in claim 43, wherein the second communication device is receiving the related data from the first communication link and the second communication link, and wherein the second communication device uses the related data from only one of the communication links.

51. The first communication device as defined in claim 43, wherein the first network and the second network are each a network selected from the group consisting of a CDMA network, a Local Area Network (LAN), a wireless LAN, a global computer network, a General Packet Radio Service (GPRS) network, a Global System for Mobile Communication (GSM) network, a Universal Mobile Telecommunications System (UMTS) network, and the Public Switched Telephone Network (PSTN).

52. The first communication device as defined in claim 43, further comprising means for discovering the second network before the second communication link is established.

53. The first communication device as defined in claim 43, wherein the second communication device comprises a legacy communication device and wherein a network application gateway facilitates the soft handoff from the first network to the second network.

54. The first communication device as defined in claim 43, wherein the negotiating is performed before the establishing of the second communication link.

55. The first communication device as defined in claim 43, wherein the negotiating is performed during the establishing of the second communication link.

56. The first communication device as defined in claim 43, wherein the negotiating is performed after the establishing of the second communication link.

57. A network application gateway for communicating across different networks, the network application gateway comprising:

means for communicating in a call between a first communication device and a second communication device using a first communication link through a first network;

means for negotiating between the first communication device and the second communication device to use a second communication link through a second network for the call, wherein the call originates at one of the first communication device and the second communication device;

means for determining that the second network is preferred over the first network based on at least one of network preference criteria;

means for establishing the second communication link through the second network between a third communication device and the second communication device while maintaining the first communication link through the first network between the first communication device and the second communication device;

means for sending related data through the first communication link in the first network and through the second communication link in the second network such that the related data is for the call;

means for dropping the first communication link; and means for continuing the call using the second communication link between the third communication device and the second communication device.

* * * * *